(12) United States Patent
Weinig et al.

(10) Patent No.: US 10,445,396 B2
(45) Date of Patent: Oct. 15, 2019

(54) DEVICE, METHOD, AND GRAPHICAL USER INTERFACE FOR EXTENDING FUNCTIONALITY OF A HOST APPLICATION TO ANOTHER APPLICATION

(71) Applicant: Apple Inc., Cupertino, CA (US)

(72) Inventors: Samuel M. Weinig, Sunnyvale, CA (US); Jeffrey S. Miller, Mountain View, CA (US); Yongjun Zhang, Cupertino, CA (US)

( * ) Notice: Subject to any disclaimer, the term of this patent is extended or adjusted under 35 U.S.C. 154(b) by 409 days.

(21) Appl. No.: 14/726,340

(22) Filed: May 29, 2015

(65) Prior Publication Data

US 2015/0347617 A1    Dec. 3, 2015

Related U.S. Application Data

(60) Provisional application No. 62/006,048, filed on May 31, 2014.

(51) Int. Cl.

| | |
|---|---|
| G06F 17/00 | (2019.01) |
| G06F 16/957 | (2019.01) |
| H04L 29/06 | (2006.01) |
| G06F 16/958 | (2019.01) |
| G06F 21/53 | (2013.01) |

(Continued)

(52) U.S. Cl.
CPC ........ *G06F 16/9577* (2019.01); *G06F 16/986* (2019.01); *G06F 21/53* (2013.01); *G06F 21/629* (2013.01); *H04L 63/145* (2013.01); *H04L 67/02* (2013.01)

(58) Field of Classification Search
CPC ........................... G06F 17/2247; G06F 3/0482

USPC .................................................. 715/234, 200
See application file for complete search history.

(56) References Cited

U.S. PATENT DOCUMENTS

| | | | |
|---|---|---|---|
| 8,200,962 B1 * | 6/2012 | Boodman | ............... G06F 21/53 |
| | | | 713/161 |
| 8,272,048 B2 | 9/2012 | Cooper et al. | |
| | | (Continued) | |

OTHER PUBLICATIONS

Chris Hoffman, Beginner Geek: Everything You Need to Know About Browser Extension, published Aug. 1, 2013, howtogeek.com, pp. 1-6.*

(Continued)

*Primary Examiner* — Manglesh M Patel

(57) ABSTRACT

A host application executing on a client device includes a content processing extension that extends its functionality to process content items to a requesting host application executing on a client device. The content processing extension is an executable file that includes data conversion code and application code. The data conversion code, when executed in requesting host application, identifies content items provided by the requesting host application and formats the identified content items to be received by the content processing extension. The application code is native code executable by the host application associated with the content processing extension. The application code processes the results from execution of the data conversion and the identified content items in accordance with one or more functions of the host application, and returns the processed content items to the requesting host application via the content processing extension.

20 Claims, 11 Drawing Sheets

(51) Int. Cl.
    *G06F 21/62*         (2013.01)
    *H04L 29/08*         (2006.01)

(56) References Cited

U.S. PATENT DOCUMENTS

| | | | | |
|---|---|---|---|---|
| 8,850,574 | B1 * | 9/2014 | Ansel | G06F 21/53 |
| | | | | 717/107 |
| 2007/0016949 | A1 * | 1/2007 | Dunagan | G06F 21/51 |
| | | | | 726/22 |
| 2015/0347749 | A1 | 12/2015 | Kiehtreiber et al. | |

OTHER PUBLICATIONS

Guha Arjun et al., Verified Security for Browser Extensions, 2011, IEEE Symposium on Security and Privacy, pp. 115-130.*

Chris Hoffman, Sandboxes Explained: How They're Already Protecting You and How to Sandbox Any Program, Published Aug. 2, 2013, howtogeek.com, pp. 1-8 (pdf).*

Nicolas Sylvain, A new approach to browser security: the Google Chrome Sandbox, Published Oct. 2, 2008, Chromium Blog, pp. 1-7 (pdf).*

* cited by examiner

DEVICE, METHOD, AND GRAPHICAL USER INTERFACE FOR EXTENDING FUNCTIONALITY OF A HOST APPLICATION TO ANOTHER APPLICATION

CROSS REFERENCE TO RELATED APPLICATIONS

This application claims the benefit of U.S. Provisional Application No. 62/006,048, filed May 31, 2014, which is incorporated by reference in its entirety.

TECHNICAL FIELD

This relates generally to a host application executable by a computing device. More particularly, the disclosed embodiments relate to providing an extension of a host application extending functionality of the host application to another host application executable by the computing device.

BACKGROUND

Security concerns for all types of processor-based electronic devices, and particularly for computing devices, have become a significant concern. While some concerns may relate to detrimental actions which may be undertaken by defective code implemented by such devices, the greater concerns relate to the ramifications of various types of attacks made upon such devices through malicious code, including code conventionally known in the field by a number of names, including "viruses," "worms," "Trojan horses," "spyware," "adware," and others. Such malicious code can have effects ranging from relatively benign, such as displaying messages on a screen, or taking control of limited functions of a device; to highly destructive, such as taking complete control of a device, running processes, transmitting and/or deleting files, etc. Virtually any type of imaginable action on a processor-based device has been the subject of attacks by malicious code.

Many of these attacks are directed at computing devices, such as workstations, servers, desktop computers, notebook and handheld computers, and other similar devices. Many of these computing devices can run one or more application programs which a user may operate to perform a set of desired functions. However, such attacks are not limited to such computing devices. A broader group of various types of devices, such as cell phones; personal digital assistants ("FDA's"); music and video players; network routers, switches or bridges; and other devices utilizing a microprocessor, microcontroller, or a digital signal processor, to execute coded instructions have been the subjects of attacks by malicious code.

In one particular situation, one application such as a browser application may have to invoke a plugin (also referred to as an application extension), which may be developed by a third party. Typically, when an application invokes a plugin that is associated with the application (also referred to as a host application), the operating system launches the plugin within the same process address space of the application, as shown in FIG. 1. Referring to FIG. 1, when application 104 invokes plugin 105, application launch module 102 of an application manager 101 loads plugin 105 within the same process address space 106 of application 104. Since application 104 and its plugin 105 are running within the same address space 106, plugin 105 may be able to access resources that are accessible by application 104, where the resources may be managed by resource manager 103. From the view point of resource manager 103, application 104 and plugin 105 are the same process. That may cause application 104 to be vulnerable if plugin 105 turns out to be malware.

For example, if plugin 105 is a third party plugin developed for application 104 and if application 104 can access a local storage and a network, plugin 105 may exploit and attack the files stored in the local storage and the network. In addition, even if plugin 105 is not malware, when plugin 105 crashes, it may bring down application 104 or cause application 104 to malfunction. Furthermore, when plugin 105 is terminated by launch module 102, the termination of plugin 105 may cause application 104 unstable since they are in the same process address space 106.

A conventional system utilizes a customized universal resource locator (URL) scheme for inter-process communications between two applications, which suffers from discoverability limitations, security concerns, and a general lack of flexibility where bi-directional communication is difficult and fragile. The URL schemes may cause an application to switch to the host application, which may bump the user out of the initiating application and destroy any of the visual context and the associated workflow will be lost. It is very difficult to detect such a situation.

A number of methodologies have been used in an attempt to reduce or eliminate both the attacks and influence of malicious or defective code. Generally, these methodologies include detection, prevention, and mitigation. Specifically, these methodologies range from attempts to scan, identify, isolate, and possibly delete malicious code before it is introduced to the system or before it does harm (such as is the objective of anti-virus software, and the like), to restricting or containing the actions which may be taken by processes affected by malicious or defective code. However, there has been a lack of efficient ways for handling a plugin associated with an application that invokes another application in a secured manner.

SUMMARY

According to some embodiments, a host application includes a content processing extension that extends its functionality to process content items to a requesting host application executing on a client device. The content processing extension is an executable file that includes data conversion code and application code. The data conversion code, when executed in requesting host application, identifies content items provided by the requesting host application and formats the identified content items to be received by the content processing extension. In some embodiments, the data conversion code comprises a set of instruction written in a scripting language such as JavaScript™, or any other programming language that is executable by the requesting host application. The application code is native code executable by the host application associated with the content processing extension. As used herein, native code refers to code that is executable by a specific application or without additional components. The application code processes the results from execution of the data conversion and processes the identified content items in accordance with one or more functions of the host application and returns the processed content items to the requesting host application via the content processing extension. The application code also launches the content processing extension in a separate sandboxed environment and facilitates an inter-process communications (IPC) mechanism or framework between the requesting host application and the content processing extension. The IPC communication mechanism allow the requesting application to access the functionalities of the content processing extension via the IPC communications mechanism, while preventing unauthorized access by the requesting host application of sensitive information about a user accessible by the host application.

DETAILED DESCRIPTION

Application Extension Framework

Figure 1:
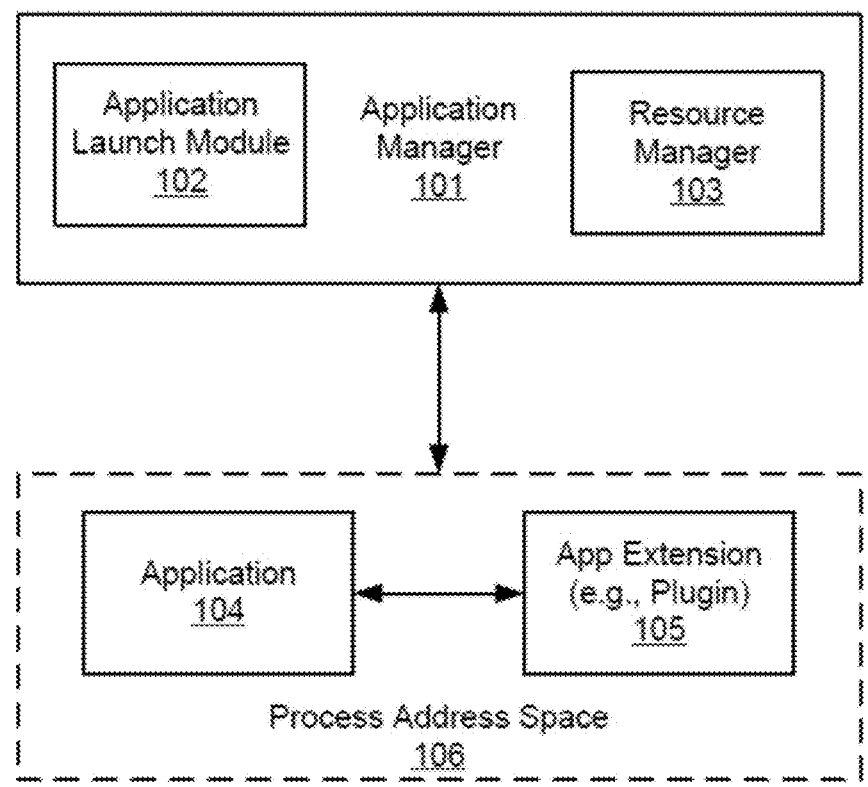
FIG. 1 is a diagram illustrating a conventional operating system of a data processing system.

The extension framework includes a set of extension interfaces, referred to herein as extension points, to allow a first application (e.g., a requesting host application) to invoke an extension of a second application to access a set of predefined functionalities associated with the second application, which is extended by the extension (referred to herein as an extended service or extension service). The set of extension points may include various commonly used or popular functionalities or services associated with the operating system. An extension point defines a set of predefined application programming interfaces (APIs) or communications protocols that allow a client, either being the first application or the second application, to access or provide a service from and to another client. A service provided by an extension point may be provided by a standard component of the operating system or a third party function provided by a third party vendor.

In one embodiment, the extension framework operates as a connecting operator between two processes (e.g., an extension and a host application). The extension framework provides the discovery aspect and extends the security domain. When a first application is configured to access a predefined functionality (e.g., photo editing or photo filtering) provided by another application, the first application communicates with the corresponding extension point associated with that predefined functionality to inquire about who can provide such a service. The extension framework in turn searches and identifies a list of one or more extensions provided by other applications that have been registered with the extension framework to provide the requested service. The extension framework may return the list of the identified extensions to allow the first application, such as a content viewing application or web browser, to select one of the second applications, such as a messaging or social networking application, in the list for the requested service. In response to a selection of one of the extensions, which may be provided by or associated with a second application, the extension framework launches the selected extension in a separate sandboxed environment and facilitates an interprocess communications (IPC) mechanism or framework between the first application and the selected extension to allow the first application to access the functionalities of the selected extension via the IPC communications mechanism.

According to one embodiment, an extension point acts as an interface for a software developer for an extension and provides a domain that the extension operates. Each extension point is associated with a predefined set of policies (e.g., resource entitlements or restrictions) and specifies what messages can be exchanged between the host application and the extension. All extensions designed for a particular extension point must comply with the specification set forth in the predefined policies of that particular extension point. All extensions, when executed in an operating environment, are entitled to or restricted by the same set of operating environment parameters defined by the associated extension point. When the extension of the second application is developed, a developer can utilize an extension template associated that particular extension point as part of a software development kit (SDK) to generate executable images of both the second application, referred to herein as a container application, and the associated extension. The extension and the container application may be released in a bundle. The bundle includes the container application and its metadata describing the container application, and the extension and its metadata describing the extension. However, the container application and the extension can be launched in separate sandboxed environments and operated independently, which may be configured based on their respective metadata and/or the corresponding extension point, although they may access or share a common library or framework.

Figure 2:
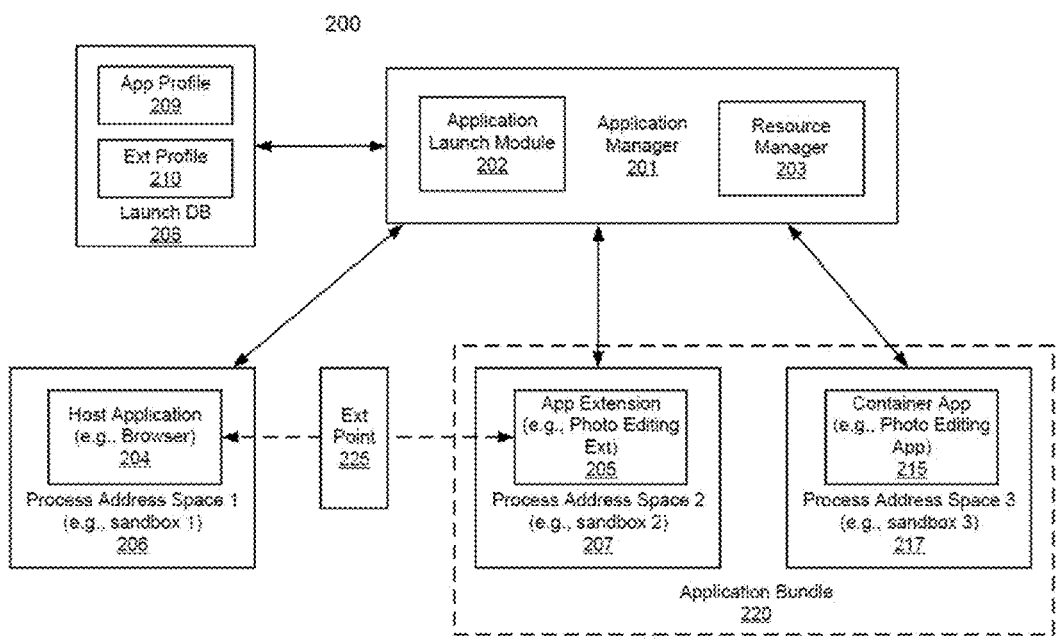
FIG. 2 is a diagram illustrating a system architecture for managing application extensions in accordance with some embodiments.

FIG. 2 is a diagram illustrating a system architecture for managing application extensions in accordance with some embodiments. Referring to FIG. 2, system 200 represents any kind of data processing system including a processor, such as, for example, a server, a desktop, a laptop, a tablet, or a mobile phone, etc. System 200 includes an application manager 201 having an application launch module 202 and a resource manager 203 for launching and managing applications, such as application 204 and application extension 205, executed within system 200 by processing resources (not shown). Processing resources may present one or more processors or processor cores. A physical processor typically refers to an integrated circuit, which potentially includes any number of other processing elements, such as cores, accelerators, or hardware threads. A core often refers to logic located on an integrated circuit capable of maintaining an independent architectural state, where each independently maintained architectural state is associated with at least some dedicated execution resources. A processor configured to execute instructions to extend the functionality of container application to another host application executing on a client device is disclosed herein.

Application manager 201 may be a part of an operating system (OS) running and executed by the processing resources within system 200. An operating system is a collection of software that manages computer hardware resources and provides common services for computer programs. Application programs usually require an operating system to function. Amongst many functionalities of an operating system, scheduling is the method by which threads, processes or data flows are given access to system resources (e.g. processor time, communications bandwidth). This is usually done to load balance and share system resources effectively or achieve a target quality of service. In addition to application manager 201, an operating system may further include other core components, such as a scheduler, a device manager, a kernel, etc. In order not to unnecessarily obscure the embodiments, these components are not shown herein. Note that application launch module 202 and/or resource manager 203 may be executed as a separate component outside of application manager 201 or integrated with another component of the operating system. The operating system of system 200 may be any kind of operating system, such as, for example, iOS™ from Apple®, Android™ from Google®, Windows™ from Microsoft®, or other operating systems (e.g., UNIX, LINUX, real-time or embedded operating systems).

According to one embodiment, each of applications may be executed within a respective dedicated or isolated operating environment, such as a sandboxed environment, and managed by application manager 201. For example, application 204 is launched and executed as a first process within a first sandboxed environment 206 as a first process address space. Application extension 205 is launched and executed as a second process within a second sandboxed environment 207 as a second process address space. A process address space refers to a virtual address space or address space that is the set of ranges of virtual addresses that an operating system makes available to a process. The range of virtual addresses usually starts at a low address and can extend to the highest address allowed by the computer's instruction set architecture. This provides several benefits, one of which is, if each process is given a separate address space, security through process isolation.

Application 204 may be a content viewing application such as a browser application as a first application, such as Safari™ from Apple Inc.®, Internet Explorer™ from Microsoft®, or Google Chrome™ from Google Inc.® Application extension 205 may be an plugin of a second application 215, such as Adobe Acrobat™ from Adobe System®, where the plugin is specifically designed for the first application to access functionalities of the second application (e.g., container application 215). Application extension 205 and second application 215 may be developed by a third party and released to the market as a bundle 220. When second application 215 is installed in system 200, an application installer (not shown) parses the metadata of bundle 215 and recognizes that application extension 205 is designed for application 204. Application extension 205 is then associated with or mapped to application 204, for example, in launch database 208 or in a registry of an operating system. As a result, application extension 205 may be installed and available to application 204 to allow application 204 to invoke application extension 205 at runtime.

According to one embodiment, application extension 205 and application 204 hosting application extension 205 are loaded and executed in separate process address spaces 206-207 and treated like separate processes by an operating system. In one embodiment, application 204 is launched and executed in a first sandboxed environment as a first sandboxed process and the application extension 205 is launched and executed in a second sandboxed environment as a second sandboxed process. The first sandboxed environment and the second sandboxed environment are configured based on a first security profile 209 and a second security profile 210 (which may be as part of launch database 208 for some or all of applications installed in system 200), respectively. Application 204 and application extension 205 communicates with each other via an inter-process communications (IPC) framework (not shown), which may be brokered by corresponding extension point 225.

According to one embodiment, application 204, application extension 205, and container application 215 are executed in their own security contexts. A security context may process resources, security configuration, sandbox environment, and any other measures or policies that ordinarily separates applications from each other. With separate security contexts and the extension framework, the system provides an ability to separately constrain each extension to its minimum needed security profile, for example, using sandboxing, entitlements, and other existing system technologies. Extension point 225 may be one of various extension points that have been defined by the operating systems. To allow application 204 and application extension 205 to communicate with each other, application 204 and extension 205 conform to a set of specified policies and/or communications protocol(s) (e.g., APIs) that are specifically designed for extension point 225. Thus, application 204 and application extension 205 are compiled using an SDK or libraries specifically for extension point 225.

The operating system enforces the security and manages resources of application 204 and application extension 205 individually or independently based on the first and second security profiles 209-210, respectively. Note that second application 215, when executed, may be launched in a separate sandboxed environment 217, which may be configured based on its respective security context. When application 204 accesses a functionality provided by application extension 205, there is no need to launch container application 215 as they are treated as separate programs, although application extension 205 and application 215 may share the same library or framework during the execution.

A sandboxed process refers to a process that has been isolated within a restricted operating environment (e.g., sandbox) that limits the process to a set of predefined resources. Each sandboxed process may be associated with a set of dedicated system resources, such as, a dedicated memory space, a dedicated storage area, or a virtual machine, etc. One of the purposes of sandboxing an application is to isolate the application from accessing other unnecessary or unrelated system resources of another application or a system component, such that any damage caused by the application would not spill over to other areas of system 200.

To provide security, an application may be "contained" by restricting its functionality to a subset of operations, while permitting operations used to perform proper operation, i.e., operation according to its intended functionality. One method to implement a limited set of policies for each application is to contain, or "sandbox" the application. Sandboxing of an application or process can be achieved using operating system level protection to provide containment and to enforce security policies, such as policies that restrict the ability of the application to take actions beyond those functions needed for it to provide its intended functionalities.

When an application has been sandboxed during execution, the application is executed as a sandboxed process or thread within the system that is contained within a sandbox (also referred to as an application container), in which it cannot access certain system resources or another territory (e.g., sandbox) of another application, subject to a security profile associated with the sandboxed application, which is referred to as a sandboxed process or a sandboxed application.

A sandboxed process is the application or other program for which security containment will be implemented. In many cases, a sandboxed process is a user application, but it could be another program implemented on the computing device such as a daemon or a service. To increase security and provide an efficient mechanism, portions of the security system are implemented or executed in a kernel space. In addition, a monitor process module (not shown) is executed in a separate memory space from the sandboxed processes to further insulate them from each other. In particular, a sandboxed process is restricted from accessing memory outside of its process space and is further prohibited from spawning a non-sandboxed process. For example, a security profile of a sandboxed process may include a rule or policy that denies the sandboxed process from using certain system calls, which may be a mechanism that allows processes to alter each other's address spaces.

In some embodiments, a policy may prevent a program from performing certain actions based on the state of an external accessory connected to the computing device, e.g. if an accessory of a specific type or identity is connected; is disconnected, or is connected and is in (or is not in) a specific mode. For example, an application may only be allowed to communicate over an externally accessible data bus if an accessory that meets certain criteria is connected to the data bus and is in a receptive mode. Further detailed information concerning sandboxing techniques are disclosed in U.S. Pat. No. 8,272,048, which is incorporated by reference herein in its entirety.

Referring back to FIG. 2, security profile 209 specifies a first set of restricted resources that application 204 can utilize during its operations within process address space 206, based on a first security context associated with application 204. Similarly, security profile 210 specifies a second set of restricted resources that application extension 205 may utilize during its operations within process address space 207, based on a second security context associated with extension 205. In this example, the second set of resources may be fewer (e.g., more restricted) than the first set of resources. For example, application 204 may be able to access a network and a local storage of system 200, while application extension 205 may not be able to access the same network, but it may be able to access the local storage of system 200.

According to one embodiment, one or more entitlements (e.g., as part of the corresponding security context) are defined for each program or application that is to be deployed in a data processing system. The entitlements represent certain functions or resources that the program is entitled to access during its execution. The entitlements may be specified by a developer during development of the program or alternatively, entitlements can be specified by an authorization entity, such as authorization server or provisioning server, which provisions or distributes the program. Such entitlements may be specified as an attribute or metadata attached to or embedded within the program, and optionally signed by the authorization entity using a digital certificate.

Entitlements can then be used to generate a set of rules specifying certain actions or resources that a program can or cannot do or access during execution of the program. The set of rules are then dynamically compiled, for example, during an installation of the program, into a security profile for the program. During the execution of the program, the security profile is used to enforce the set of rules to restrict the program from performing any action or accessing any resource that the program is not entitled. This in effect forces or contains the program to operate in a restricted operating environment (e.g., a sandbox or sandboxed environment). Resources refer to any kind of resources in a data processing system or electronic device, such as, for example, memories, inputs/outputs (IOs), buses, storage, files, network connections (e.g., sockets, ports, or network addresses), inter-process communications channels (e.g., UNIX domain sockets, XPC, MACH ports), etc.

Restricting execution of a program within a restricted operating environment can reduce the changes of the program interfering or causing damages to other components or resources of an electronic device. For example, a program may be developed by a third party and downloaded from a network. The program may include a malfunctioning component or routine (e.g., programming bugs), which may accidentally access certain critical memory space that is normally exclusively utilized by an operating system, microprocessor, bus, or other components of the electronic device. Such actions may cause the electronic device to crash. Alternatively, a program may be a malicious program that is developed to intentionally cause damage to an operating environment and/or electronic device. For example, a program with virus may be specifically developed to take control of the electronic device and/or steal confidential information of a user that operates the electronic device. By restricting the execution of a program within a restricted operating environment, such damage can be greatly reduced.

Referring back to FIG. 2, in this example, by executing application 204 and application extension 205 in separate process address spaces 206-207, security of application 204 and application extension 205 can be independently enforced and managed. The malfunction of one entity (e.g., application extension 205) would not cause much damage of the other (e.g., application 204). In addition, resources associated with application 204 and application extension 205 can be efficiently managed. For example, if application extension 205 is no longer needed by application 204, application extension 205 can be individually terminated or unloaded, and its resources can be released back to a resource pool for other usages without significantly affecting the operations of application 204.

Figure 3:
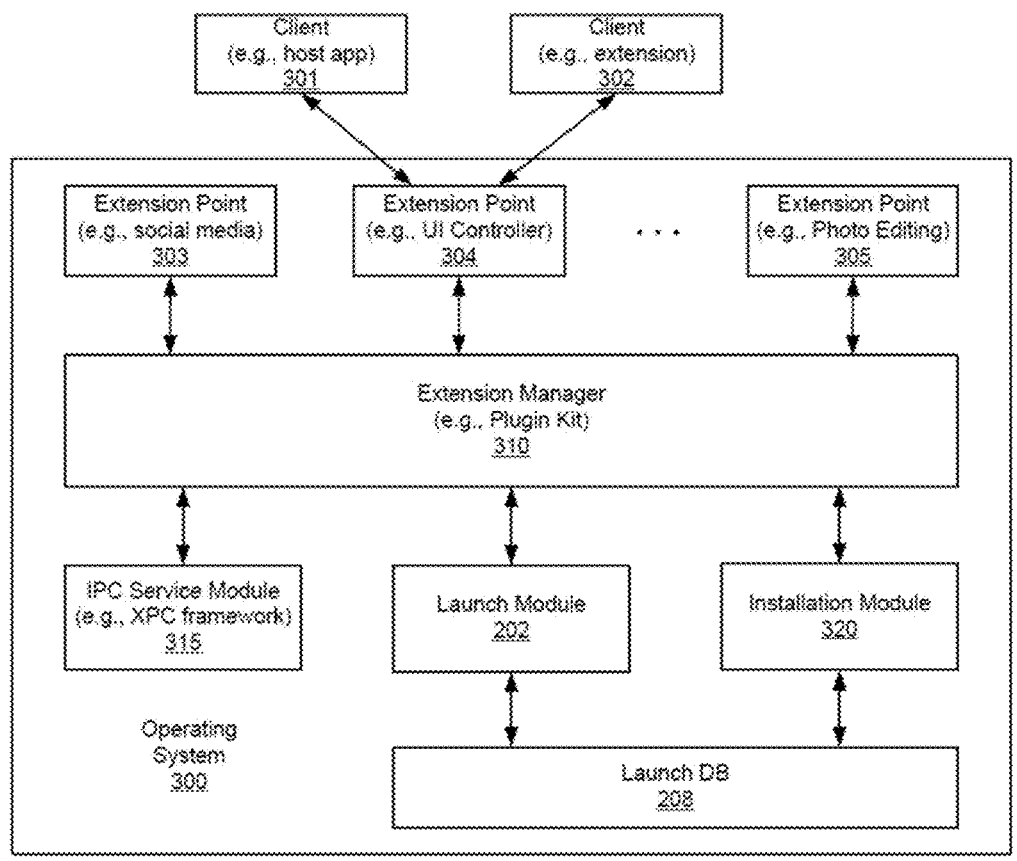
FIG. 3 is a diagram illustrating an example of architecture of an operating system in accordance with some embodiments.

FIG. 3 is a diagram illustrating an example of architecture of an operating system according to one embodiment of the invention. Operating system 300 may be implemented as part of system 200 of FIG. 2. Referring to FIG. 3, operating system 300 includes, amongst others, a set of one or more extension points 303-305 to allow various clients, such as clients 301-302, access via extension points 303-305. Each of extension points 303-305 represents a set of predefined APIs or protocols to allow one client as a host application to obtain a predefined service or services provided by another client as an extension that extends at least a portion of functionalities of another application as a container application. Each of extension points 303-305 may further define the resources, scheduling, and termination (e.g., which of the process should be terminated first, etc.) schemes for the processes associated with the extension point. In one embodiment, extension points 303-305 may include various commonly used or popular functionalities or services associated with operating system 300. An extension point defines a set of predefined application programming interfaces (APIs) or communications protocols that allow a client to access or to provide a service from and to another client. A service provided by an extension point may be provided by a standard component of the operating system or a third party function provided by a third party vendor.

Extension points 303-305 may be managed by extension manager 310, where extension points 303-305 may be collectively referred to as an extension interface or extension layer as part of system component of operating system 300. When extension 302, as well as, its corresponding container application (not shown), is installed, installation module 320 parses metadata of an application bundle containing extension 302 and its container application. Based on the metadata associated with extension 302, installation module 320 recognizes that extension 302 is specifically designed and developed for extension point 304. For example, extension 302 may be developed using a specific extension template and compiled with a specific set of libraries corresponding to extension point 304.

Installation module 320 then installs extension 302 in operating system 300 and stores any information related to extension 302 in launch database 208. For example, a security profile (e.g., configuration file) of extension 302 may be compiled and stored in launch database 208. The security profile may include information indicating that extension 302 is capable of providing a service or services through extension point 304. The security profile may further include resource entitlements or restrictions that may be subsequently utilized to configure a sandboxed environment when extension 302 is launched. Other extensions may be installed in a similar way by installation module 320.

Subsequently, when a client, in this example, application 301, inquires by communicating via extension 304 about a service available for extension point 304, extension manager 310 invokes launch module 202 (or discovery module, not shown) to discover any extensions installed in the system that are capable of providing the inquired service. In response, launch module 202 searches within launch database 208 to identify and determine which of the installed extensions are capable of providing such a service. In one embodiment, the inquiry may include information specifying certain specific resources that are required for the service. In response, launch module 202 searches and identifies those who can handle the specified resources. For example, a host application may specify the data size that a service is required to handle. Thus, the extension framework as shown in FIG. 3 is able to match the capabilities of extensions with the specification of the requested services.

If there is only one extension installed capable of providing services for extension point 304, launch module 202 may automatically launch the identified extension. If there are multiple extensions that are capable of providing services for extension point 304, launch module may present a list of the extensions to allow a user or client 301 to select one of them for launching. If there are multiple versions of the same extension installed, at least some of the versions may be presented to the user or alternatively, the latest version may be presented. Once the selected extension, in this example, extension 302, has been launched, extension manager 310 invokes IPC service module 315 to facilitate IPC communications between client 301 and client 302 via extension point 304. In one embodiment, the communications between client 301 and client 302 are asynchronous message based communications, such as the XPC framework available from Apple Inc. In one embodiment extension points 303-305 may include, but are not limited to, an extension point for the notification center of operating system 300, an extension point for a third-party keyboard, an extension point for social media, an extension point for services with a user interface (UI), an extension point for a file provider/picker, an extension point for photo editing and/or filtering, an extension point for translation, and an extension point for a file/content finder.

Extension manager 310 of the extension framework as shown in FIG. 3 is configured not to enable "generic" communication between applications and their extensions. Instead, it requires specific extension points 303-305 narrowly tailored for a particular functional purpose. This is important to formalize the data and control flow between them, making it less likely for either to be able to extend a security exploit into the other. Essentially, each extension point is a well-designed conduit for extending a suitable application. According to one embodiment, the security contexts are individually assigned to extensions as they are used by extension manager 310 (e.g., one-to-one relationship). Alternatively, the security contexts may be reused, and in some situations multiple (compatible) extensions can share a security context.

Figure 4:
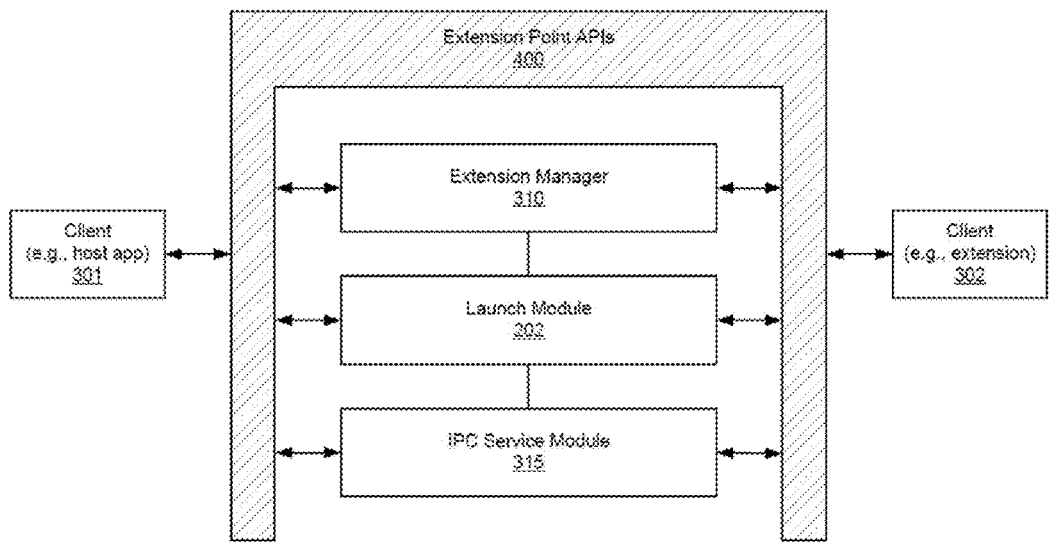
FIG. 4 is a diagram illustrating an example of architecture of an operating system in accordance with some.

In one embodiment, each of extension points 303-305 includes at least two sets of APIs, one for host applications to invoke extension services and the other for extensions to provide extension services, as shown in FIG. 4. Referring to FIG. 4, since client 301 and client 302 are executed separate sandboxed environments, they normally cannot directly communicate with each other. Rather, client 301, as a host application in this example, communicates using a first set of APIs or protocols associated with extension point 400 to access system resources such as extension manager 310, launch module 202, and IPC service module 315, etc. Similarly, client 302, as an extension in this example, communicates using a second set of APIs or protocols associated with extension point 400 to access extension manager 310, launch module 202, and IPC service module 315. In order to access extension point 400, client 301 and client 302 may be compiled and linked using an SDK that is associated with extension point 400 during the software development.

According to one embodiment, an extension point acts as an interface for a software developer for an extension and provides a domain that the extension operates. Each extension point is associated with a predefined set of policies (e.g., resource entitlements or restrictions) and specifies what messages can be exchanged between the host application and the extension. All extensions designed for a particular extension point must comply with the specification set forth in the predefined policies of that particular extension point. All extensions, when executed in an operating environment, are entitled to or restricted by the same set of operating environment parameters defined by the associated extension point.

Figure 5:
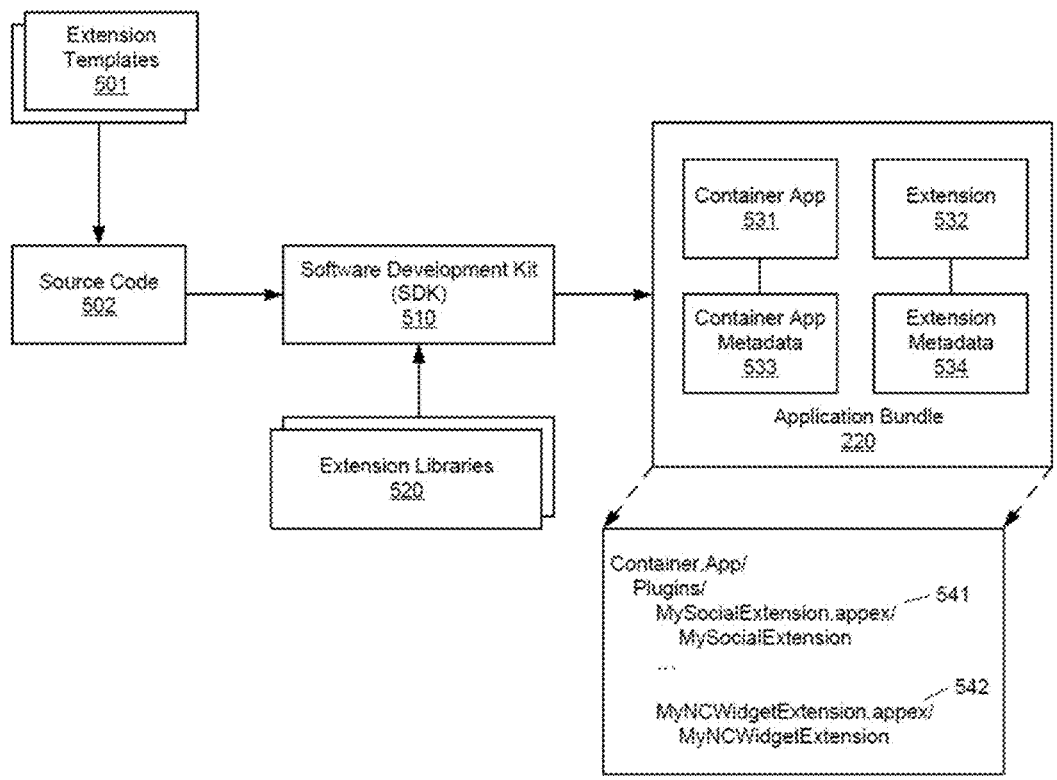
FIG. 5 is a diagram illustrating a system for developing an extension for an extension point in accordance with some embodiments.

When the extension of the second application is developed, as shown in FIG. 5, a developer can utilize an extension template 501 associated that particular extension point as part of a software development kit (SDK) to generate, based on source code 502, executable images of both a container application 531 and the associated extension 532, as well as their respective metadata 533-534. The extension and the container application may be released as bundle 220. The bundle includes the container application 531 and its metadata 533 describing the container application, and the extension 532 and its metadata 534 describing the extension. However, the container application 531 and the extension 532 can each be launched in a separate sandboxed environment and operated independently, which may be configured based on one or a combination of their respective metadata or the corresponding extension point, although they may access or share a common library or framework. In some embodiments, a container application may include multiple extensions, in this example, extensions 541 and 542.

An application bundle may be a directory that allows related resources, such as software code, to be grouped together. An application bundle may be identified by the ".app" extension (e.g., "application.app"). An application bundle may include a number of directories and/or subdirectories, such as "Contents," "Operating system," which may contain the application's executable code, identified, for example, by the ".exe" extension (e.g., "Application.exe," however in other embodiments, the executable file may have another extension or may not include an extension), "Resources," which may contain resources of the application (e.g., "Image.png"), and "XPC services," which may contain application defined services. These services may be a set of computer implemented instructions designed to implement a specific function or perform a designated task. In one embodiment, the application defined services are services which are available only to the application represented by the application bundle. In addition, these application defined services may be tied to the lifetime of the application, in that once the application is terminated, the service is no longer available.

In one embodiment, the executable code in an application bundle may link against one or more frameworks. Frameworks may include software libraries having reusable abstractions of software code wrapped in a well-defined application programming interface (API). The frameworks allow software developers to implement the standard structure of an application for a specific development environment (e.g., the operating system running on the computing device). The frameworks linked against by an application may be represented by framework bundles. Some examples of commonly used frameworks include a core audio framework and a core graphics framework. The executable files in an application may link against the frameworks by storing a framework name or other identifier of framework bundles in a designated location in the application bundle and/or by calling an API provided by the associated framework.

The services included in the framework bundles may be made available to a number of different applications that are all linking against the same framework. In one embodiment, there may be a single global instance of a particular service in a framework that is available to a certain number of different applications. In another embodiment, there may be an individual instance of a particular service that is instantiated for each user of the system, or an instance of the service for each application that is running in the system. In other embodiments, each service may have a different designation as a global instance, a per-user instance, or a per-application instance, where there may be services of each type present at the same time in the same or different framework(s). In addition, some other instance may be created at the discretion of the framework. For example, one framework may have one instance for each browser tab or window that is opened. Each instance may be identifiable by a universal unique identifier (UUID).

At the time an application is built, the application designer may specify what services are defined specifically in the application, as well as what frameworks the application will link against. The application designer may also have knowledge of what services are contained within those frameworks. Thus, between the application defined services and the services in linked frameworks, the application designer is able to grant access to all of the services that the application executable file needs or may be likely to access. In addition, the application designer is able to specify which services the application executable file is allowed to access. Therefore, unnecessary and unauthorized services are not made available to the application. This information, in a form of metadata, may eventually be compiled as a part of entitlements of a security profile associated with the application.

Referring back to FIG. 5, for at least one of the extension points associated with an operating system, an extension template (e.g., template 501) may be defined to allow a software developer to have a simple and user friendly user interface to construct source code (e.g., source code 502) for that particular extension point. For example, an extension template may be associated with a set of predefined certain objects or classes that are typically required to access the associated extension point, either from a point view of a host application or from a point of view of an extension. The extension template may further identify a set of libraries or frameworks that are specifically associated with the extension point. Thus, when an SDK tool, such as a compiler and/or linker, of SDK 510 compiles source code 502, the relevant libraries or frameworks, such as libraries 520, are utilized. As a result, all extensions compiled for the same extension point will be compatible with the same set of APIs or protocols and entitled to the same resource entitlements or limited to the same restrictions of an operating environment during execution.

In one embodiment, the developers package one or more extensions with (physically inside of) a containing application. This allows users to view them as a logical part (provided by) the containing application, even though architecturally they are separate and (by default) fully isolated from each other. This also allows the operating system to have full context isolation without burdening the user with the need to understand this architecture. In one embodiment, the operating system is able to deliver extensions not associated with applications, and the user sees those as "part of the system components."

Figure 6:
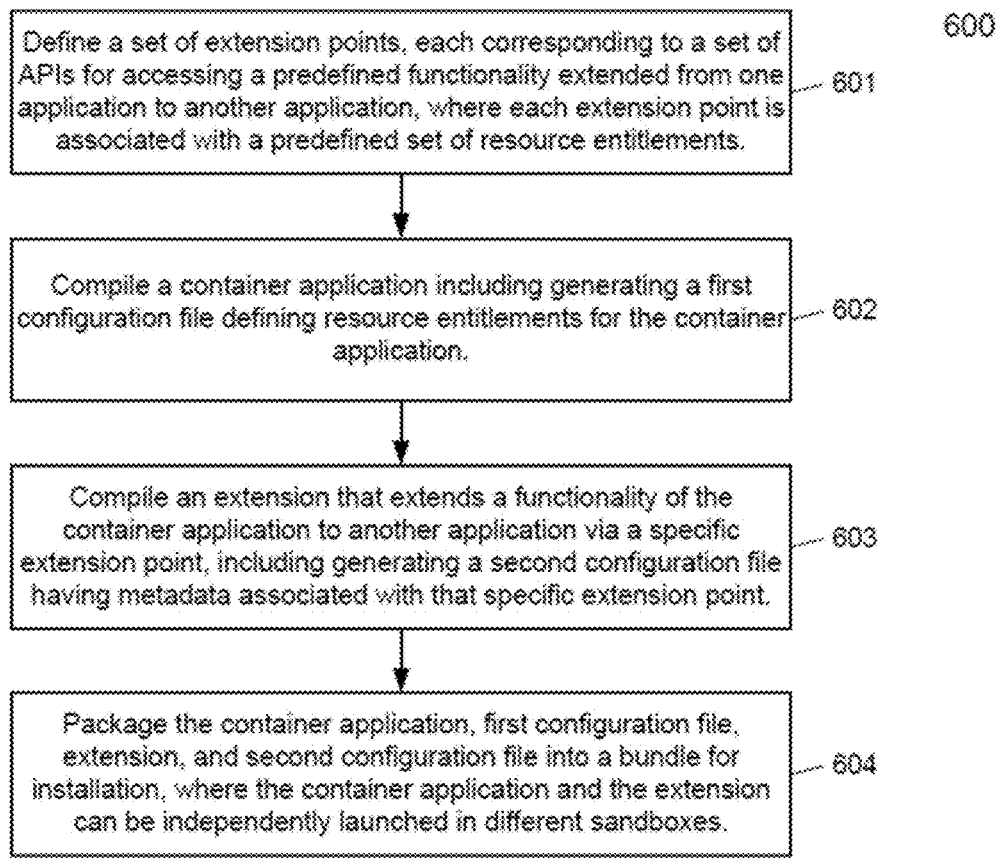
FIG. 6 is a flow chart illustrating a method for developing extensions for extension points in accordance with some embodiments.

FIG. 6 is a flow diagram illustrating a method for developing extensions for extension points according to one embodiment of the invention. Method 600 may be performed by processing logic which may include software, hardware, or a combination thereof. For example, method 600 may be performed by SDK 510 of FIG. 5. Referring to FIG. 6, at 601, a set of extension points is defined. Each extension point is associated with a set of APIs to allow one application to access a predefined functionality or obtain a service, which may be extended from another application (e.g., container application) via an extension. At 602, a container application is compiled including generating a first configuration file defining resource entitlements for the container application. At 603, an extension that extends a functionality of the container application to another application via a specific extension point is compiled, including generating a second configuration file having metadata associated with that extension point. At 604, the container application and the extension, as well as their respective configuration files are packaged into a bundle for installation. The container application and the extension can be launched in different sandboxes independently.

Figure 7:
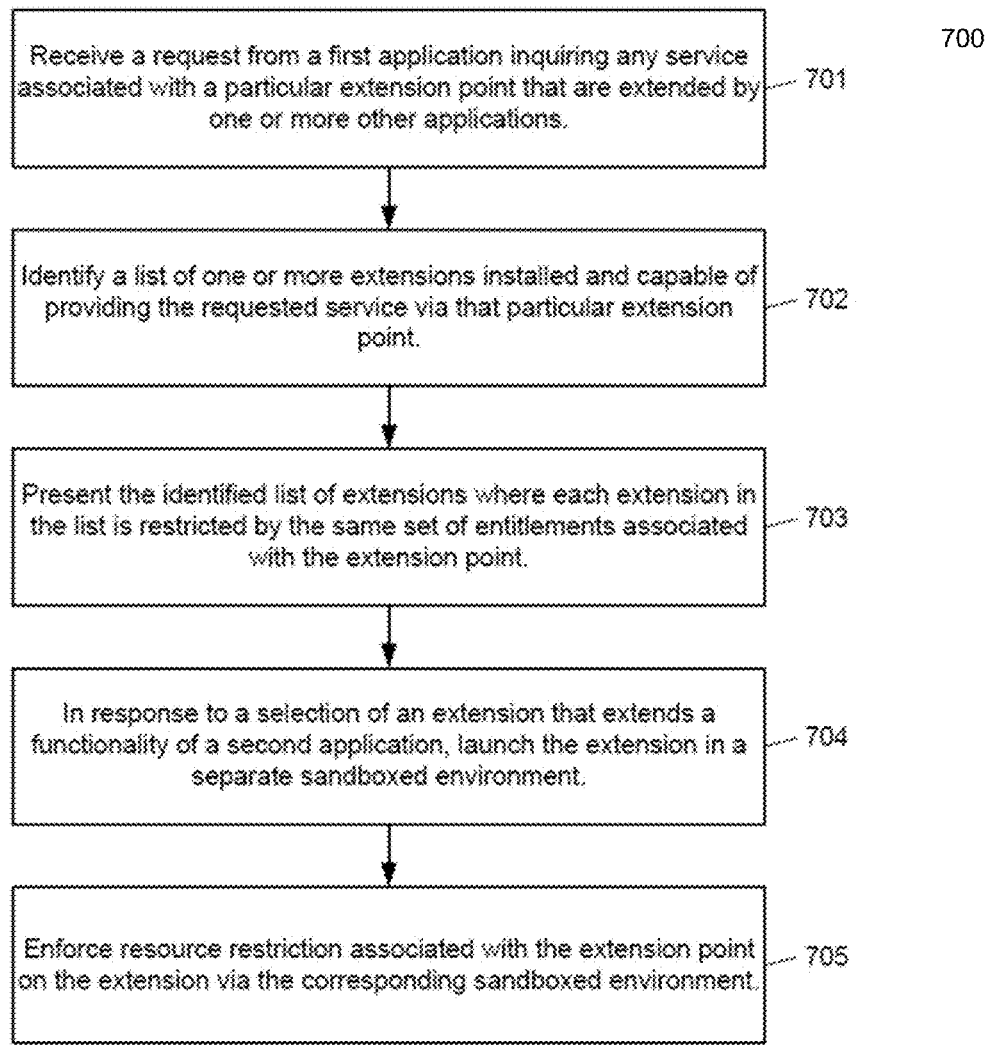
FIG. 7 is a flow diagram illustrating a method for managing extensions via extension points in accordance with some embodiments.

FIG. 7 is a flow diagram illustrating a method for managing extensions via extension points according to one embodiment of the invention. Method 700 may be performed by processing logic which may include software, hardware, or a combination thereof. For example, method 700 may be performed by operating system 300 of FIG. 3. Referring to FIG. 7, at 701, processing logic receives a request from a first application inquiring any service associated with a particular extension point extended by one or more other applications. In response to the request, at 702, processing logic identifies a list of one or more extensions installed and capable of providing the requested service via that particular extension point. At 703, the list of identified extensions is presented to a user or to the first application for selecting one of the extensions. At 704, in response to a selection of an extension that extends a functionality of a second application, processing logic launches the extension in a separate sandboxed environment. Note that the extension can be independently executed without having to launch the second application. At 705, resource restriction associated with the extension point is enforced on the extension via the corresponding sandboxed environment.

As described above, examples of extensions include, but are not limited to, an extension point for the notification center of operating system 300, an extension point for a third-party keyboard, an extension point for social media, an extension point for services with a user interface (UI), an extension point for a file provider/picker, an extension point for photo editing and/or filtering, an extension point for translation, and an extension point for a file/content finder. Some of these extensions, such as a translation extension point or a filtering extension point, are referred to as action extension points. According to one embodiment, an action extension may include piece of executable code, such as JavaScript or other scripts that can be invoked and downloaded from the extension, and executed within the host application to help certain tasks of the host application.

Figure 8:
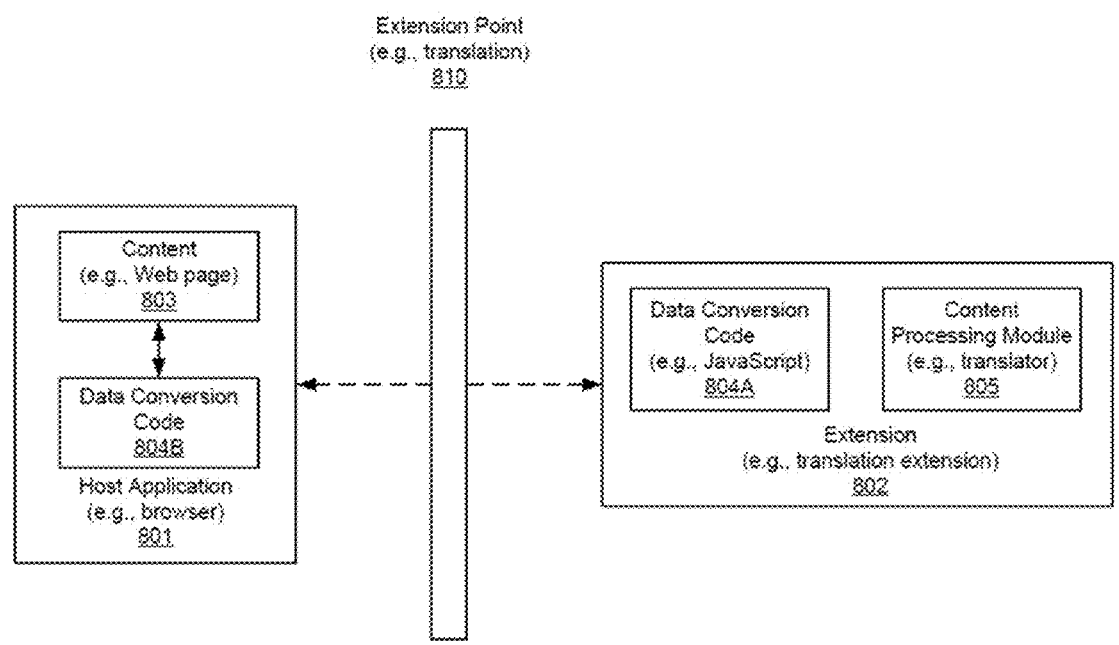
FIG. 8 is a diagram illustrating an action extension in accordance with some embodiments.

FIG. 8 is a diagram illustrating an example of an action extension point according to one embodiment of the invention. Referring to FIG. 8, action extension 802, in this example, is a content processing extension that is designed to process content or data for a client such as host application 801 via action extension point 810. Action extension 802 may be developed by a third-party developer that is different than the one providing the operating system. In one embodiment, action extension 802 includes data conversion code 804A in addition to content processing function or module 805. Data conversion code 804A, as a helper agent, may be implemented in a form of executable script, such as JavaScript™.

In one embodiment, when host application 801 requests an action extension service, for the purpose of illustration, a translation extension service, action extension point 810 (e.g., translation extension point) identifies and launches extension 802 to provide translation services. In addition, host application 801 may invoke data conversion code 804A to perform certain data conversion before content processing module 805 performs the actual translation. In one embodiment, host application 801, in this example, a browser application, downloads data conversion code and executed within host application 801 as data conversion code 804B.

Data conversion code 804B, when executed, is configured to parse content 803 to identify which portion of content 803 needs to be processed by content processing module 805. Data conversion code 804B packages the identified content to a format compatible with extension point 810 and sends the packaged data to extension 802 to be processed by content processing module 805, in this example, a translation module to translate content. In response to the result of the content processing, i.e., translated content, data conversion code 804B is to reformat the translated content to be compatible with content 803 and incorporates the translated content with content 803.

This embodiment can be applied to the situation which host application 801 is a browser application displaying certain content 803 as a hypertext markup language (HTML) page. The browser application can download the JavaScript, i.e., data conversion code 804A and execute it as code 804B. The JavaScript can then process the HTML content 803 to parse and understand the HTML page in order to identify the interested data to be translated. As a result, content processing module does not have to understand the structure of the HTML page. Data conversion code operates as a helper agent for extension 802 (similar to an extension of another extension). Note that data conversion code 804B still communicates with extension 802 via extension point 810. Data conversion code 804A is bundled within extension 802, but it is downloaded and executed by host application 801 as code 804B.

Figure 9:
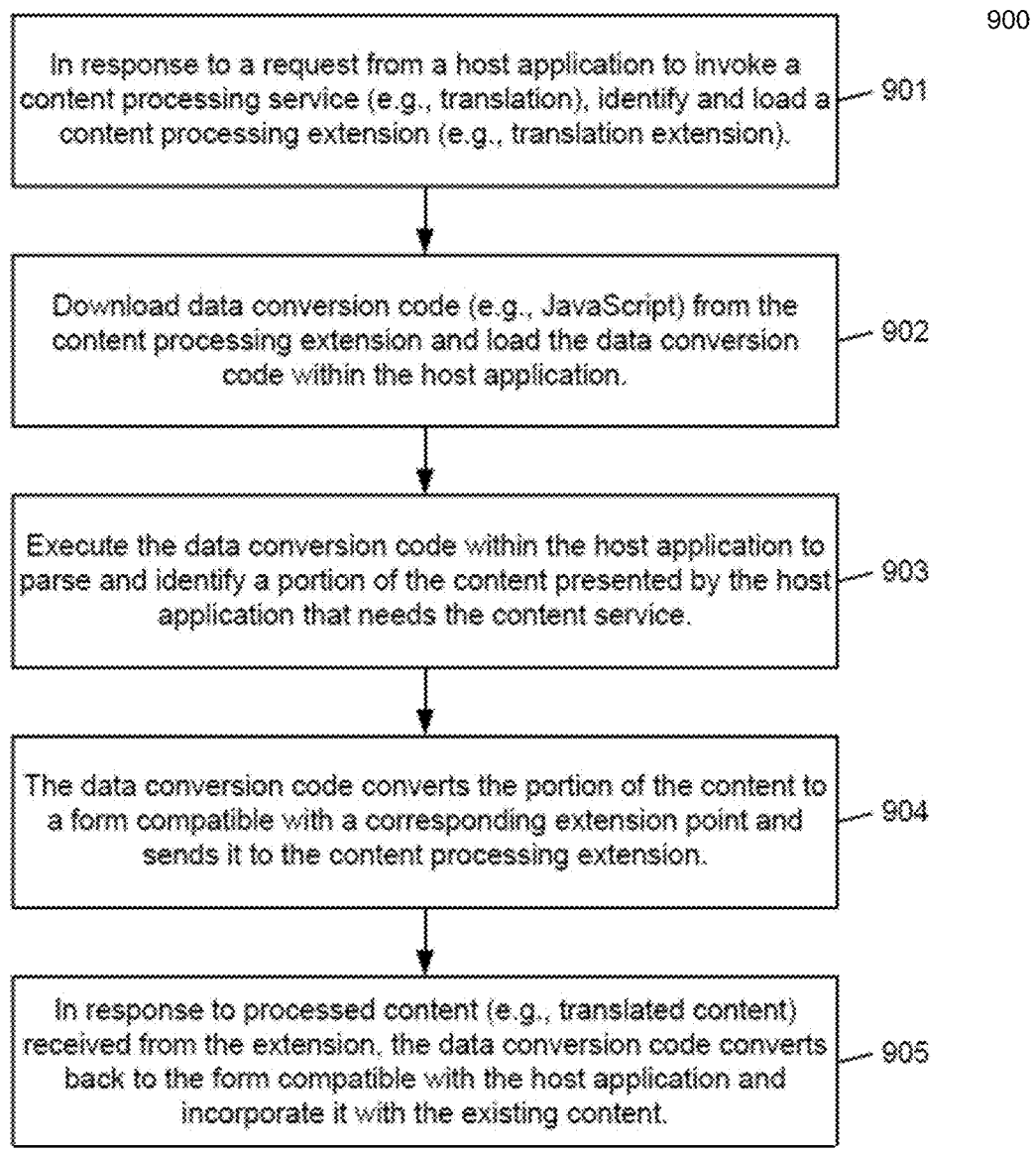
FIG. 9 is a flow diagram illustrating a method of providing an action extension service in accordance with some embodiments.

FIG. 9 is a flow diagram illustrating a method performed by an action extension point according to one embodiment of the invention. Method 900 may be performed by processing logic which may include software, hardware, or a combination thereof. For example, method 900 may be performed by the system as shown in FIG. 8. Referring to FIG. 9, at 901, in response to a request from a host application to invoke a content processing service (e.g., translation), processing logic identifies and loads a content processing extension. The host application may browser application displaying a Web page and the extension may be a translation extension providing translation services. At 902, processing logic downloads data conversion code from the extension and loads the data conversion code within the host application. The data conversion code may be an executable script such as JavaScript. At 903, the host executes the data conversion code to parse and identify a portion of the content presented by the host application. At 904, the data conversion code converts the identified portion of the content to a form compatible with a corresponding extension point (e.g., translation extension point) and sends the converted data to the extension via the extension point. In response to the processed content (e.g., translated content) received from the extension, the data conversion code is to convert the data back to the form compatible with the host application and incorporate the processed content with the existing content of the host application.

Figure 10:
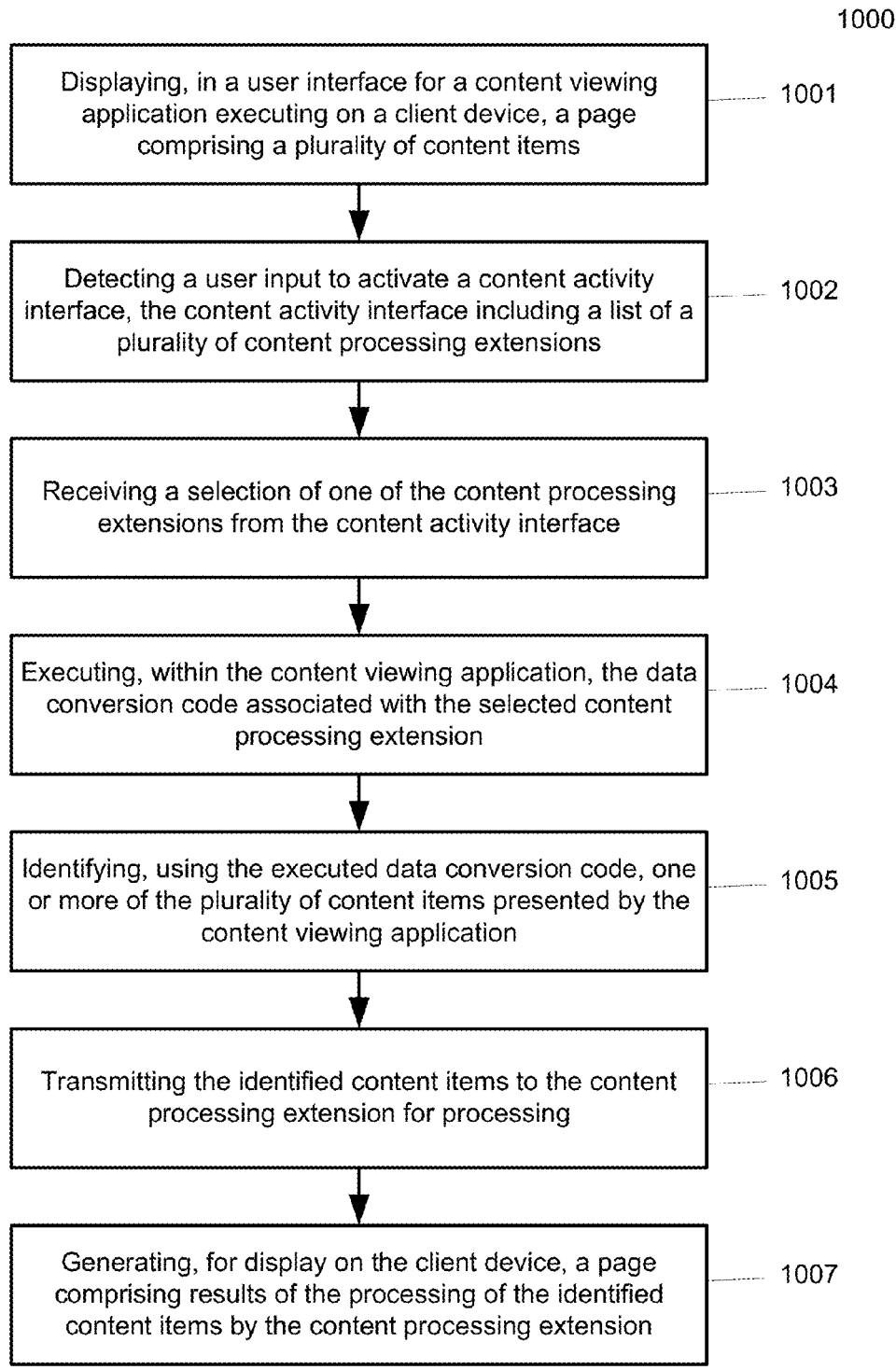
FIG. 10 is another flow diagram illustrating a method of providing an application extension service to a host application executing on a client device in accordance with some embodiments.

FIG. 10 is a flow chart depicting a method of providing an application extension service to a host application executing on a client device in accordance with some embodiments. A host application executing on a client device, such as a content viewing application, displays 1001 displays one or more content items loaded based on received user input. In one implementation, the host application is a browser application that includes a user interface for receiving a user input specifying a source for content items and a display presenting retrieved content items. The user interface also includes a menu bar or other suitable interface object for invoking other functionality provided by the browser.

In one embodiment, the user interface of the host application includes an interface for selecting a content activity interface to access one or more content processing extensions. Responsive to detecting 1002 an input to active the activity interface, the host application displays a list of content processing extensions discovered by the host application as described in conjunction with FIG. 3. In one implementation, the activity interface is a share sheet that includes content processing extensions associated with container applications that provide functionality that allows content items provided by the host application (e.g., browser application) to be shared with other users while a user interacts with the host application using the client device. The activity interface input includes a touch contact with a portion of a display included in the client device, a selection via a user interface element of a host application, or other types of interaction with the activity interface included user interface of the host application. In one implementation, the list of content processing extension includes one or a combination of social extensions and services with user interface extensions selectable by a user. In another implementation, the activity interface includes a list of functions or actions, each function or action corresponding to a particular content processing extension. When a content processing extension is selected 1003 from the list of content processing extensions, the host application sends a request to the content processing extension to invoke a content processing service associated with the selected content processing extension. In one implementation, the content processing service is a translation service as described in conjunction with 901 of FIG. 9. In other implementations, the content processing service includes one of social networking service, messaging service, or other service provided by a container application associated with the selected content processing extension.

The host application downloads data conversion code from the extension and loads the data conversion code within the host application as described in conjunction with 902 of FIG. 9. In one implementation, the data conversion code is an executable script such as JavaScript that perform operations including scraping a web page written in HTML for content items to provide to a container application, such as a social networking application executing on the client device. The executable script can be embedded in the extension. In other implementation, the scripting language of the data conversion code is written in a language suitable to identify, modify, or otherwise interact with content items provided by the requesting host application. The data conversion code executing within the host application identifies 1005 a set of content items presented by the host application and converts the identified content items to a form compatible with a corresponding extension point. For example, in one implementation, the data conversion code converts the identified content items to a JavaScript literal object. In other embodiments, the data conversion code converts the identified content items in another format in accordance with the specifications of the container application associated with the selected content processing extension.

The data conversion code sends 1006 the formatted content items to the selected content processing extension for processing via the extension point as described in conjunction with 904 of FIG. 9. The selected content processing extension and the associated container application may be launched in a separate sandboxed environment and operated independently as described in conjunction with FIGS. 2, 5, and 6, thereby restricting execution of the content processing extension within a restricted operating environment to reduce the likelihood of the content processing extension interfering or causing damages to other components or resources of the client device.

The content processing extension receives the processed content items and sends the processed content items to the requesting host application for display on the client device. In one embodiment, the processed content items include one or more content items obtained from the host application and a user interface provided by the container application. In one example, the content item is an article or news story and the user interface is a sharing interface for a social networking application. In one embodiment, the host application generates 1007 a page that includes the processed content items received from the content processing extension for display to on the client device. In another embodiment, the host application generates 1007 a page that includes the processed content items display in a portion of the user interface of the host application and additional content items not processed by the content processing extension in another portion of the user interface.

Figure 11:
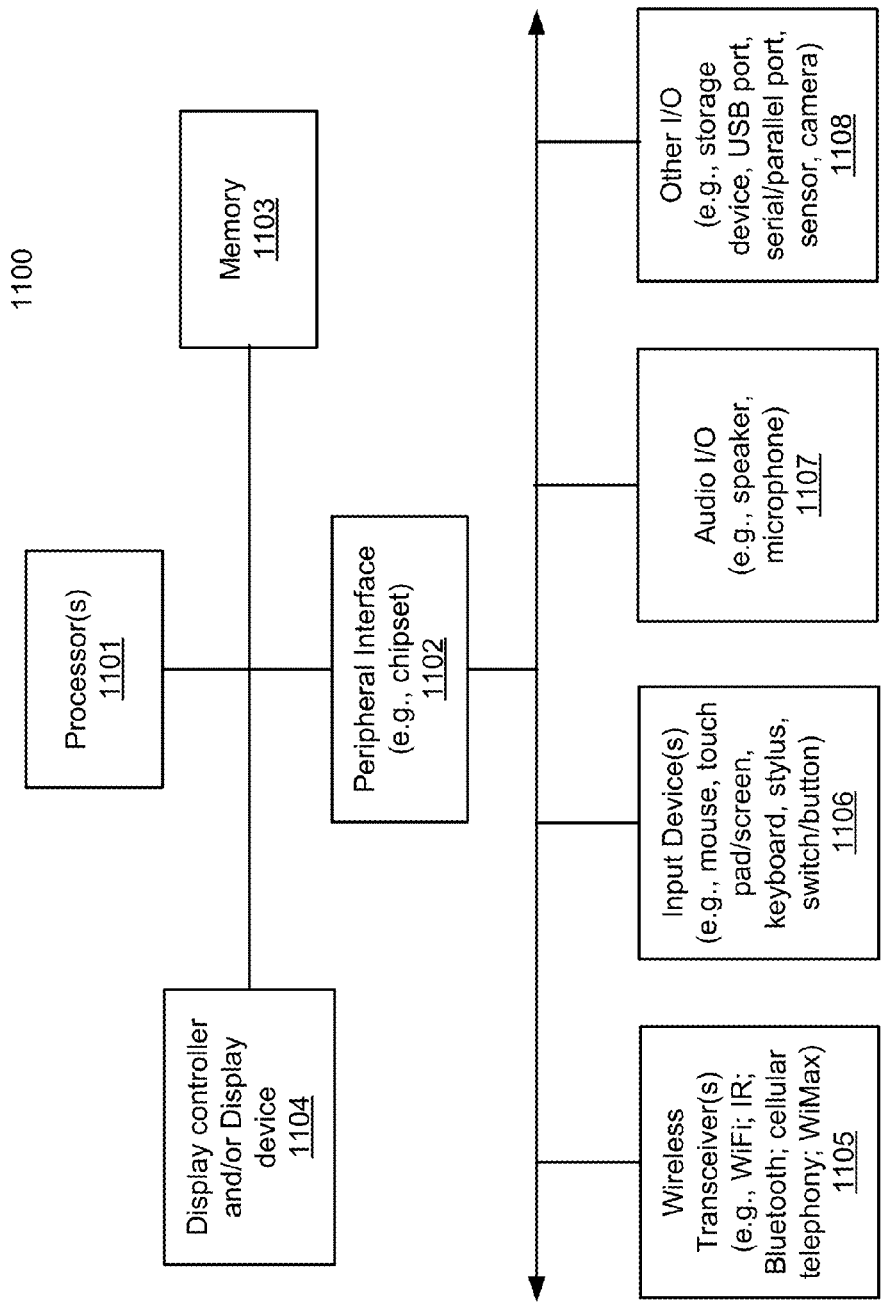
FIG. 11 is a diagram illustrating an example of a data processing system in accordance with some embodiments.

FIG. 11 is a diagram illustrating an example of a data processing system which may be used in accordance with some embodiments. For example, system 1100 may represents any of data processing systems described above performing any of the processes or methods described above. For example, system 1100 may represent systems as described above in FIGS. 2-5 and 8. System 1100 may represent a desktop (e.g., iMac™ available from Apple Inc. of Cupertino, Calif.), a laptop (e.g., MacBook™), a tablet (e.g., iPad™) a server, a mobile phone (e.g., iPhone™), a media player (e.g., iPod™ or iPod Touch™), a personal digital assistant (PDA), a personal communicator, a gaming device, a network router or hub, a wireless access point (AP) or repeater, a set-top box, or a combination thereof.

Referring to FIG. 11, in one embodiment, system 1100 includes processor 1101 and peripheral interface 1102, also referred to herein as a chipset, to couple various components to processor 1101 including memory 1103 and devices 1105-1108 via a bus or an interconnect. Processor 1101 may represent a single processor or multiple processors with a single processor core or multiple processor cores included therein. Processor 1101 may represent one or more general-purpose processors such as a microprocessor, a central processing unit (CPU), or the like. More particularly, processor 1101 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1101 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 1101 is configured to execute instructions for performing the operations and steps discussed herein.

Peripheral interface 1102 may include memory control hub (MCH) and input output control hub (ICH). Peripheral interface 1102 may include a memory controller (not shown) that communicates with a memory 1103. Peripheral interface 1102 may also include a graphics interface that communicates with graphics subsystem 1104, which may include a display controller and/or a display device. Peripheral interface 1102 may communicate with graphics device 1104 via an accelerated graphics port (AGP), a peripheral component interconnect (PCI) express bus, or other types of interconnects.

An MCH is sometimes referred to as a Northbridge and an ICH is sometimes referred to as a Southbridge. As used herein, the terms MCH, ICH, Northbridge and Southbridge are intended to be interpreted broadly to cover various chips who functions include passing interrupt signals toward a processor. In some embodiments, the MCH may be integrated with processor 1101. In such a configuration, peripheral interface 1102 operates as an interface chip performing some functions of the MCH and ICH. Furthermore, a graphics accelerator may be integrated within the MCH or processor 1101.

Memory 1103 may include one or more volatile storage (or memory) devices such as random access memory (RAM), dynamic RAM (DRAM), synchronous DRAM (SDRAM), static RAM (SRAM), or other types of storage devices. Memory 1103 may store information including sequences of instructions that are executed by processor 1101, or any other device. For example, executable code and/or data of a variety of operating systems, device drivers, firmware (e.g., input output basic system or BIOS), and/or applications can be loaded in memory 1103 and executed by processor 1101. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

Peripheral interface 1102 may provide an interface to IO devices such as devices 1105-1108, including wireless transceiver(s) 1105, input device(s) 1106, audio IO device(s) 1107, and other IO devices 1108. Wireless transceiver 1105 may be a WiFi transceiver, an infrared transceiver, a Bluetooth transceiver, a WiMax transceiver, a wireless cellular telephony transceiver, a satellite transceiver (e.g., a global positioning system (GPS) transceiver) or a combination thereof. Input device(s) 1106 may include a mouse, a touch pad, a touch sensitive screen (which may be integrated with display device 1104), a pointer device such as a stylus, and/or a keyboard (e.g., physical keyboard or a virtual keyboard displayed as part of a touch sensitive screen). For example, input device 1106 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO 1107 may include a speaker and/or a microphone to facilitate voice-enabled functions, such as voice recognition, voice replication, digital recording, and/or telephony functions. Other optional devices 1008 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor, a light sensor, a proximity sensor, etc.), or a combination thereof. Optional devices 1108 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips.

Note that while FIG. 11 illustrates various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method, comprising:

displaying, in a user interface for a content viewing application executing on a client device within a first address space, a page comprising a plurality of content items;

detecting a user input to activate a content activity interface including a list of content processing extensions, each content processing extension comprising data conversion code associated with a corresponding container application different from the content viewing application executable by the client device;

receiving a selection of one of the content processing extensions from the content activity interface;

executing, within the content viewing application, the data conversion code associated with the selected content processing extension to identify one or more of the plurality of content items presented by the content viewing application and to reformat the identified one or more content items into a format compatible with the content processing extension;

transmitting the reformatted content items to the selected content processing extension for processing within a second address space different than the first address space;

executing the selected content processing extension according to entitlements specified by a server for the second address space, the entitlements indicating resources that the selected content processing extension is entitled to access during execution; and generating, for display on the client device, a page comprising results of the processing of the reformatted content items by the selected content processing extension.

2. The method of claim 1, wherein the content viewing application and the selected content processing extension communicate with each other via an extension point, and wherein the extension point is one of a plurality of extension points of an operating system executing on the client device, each extension point corresponding to a set of predefined application programming interfaces (APIs) and a set of predefined resource entitlements.

3. The method of claim 2, wherein the content viewing application accesses a functionality provided by the selected content processing extension via the extension point without having to execute the container application associated with the selected content processing extension.

4. The method of claim 1, wherein the data conversion code is an executable script embedded within the selected content processing extension.

5. The method of claim 1, wherein the content viewing application is a browser application, and wherein the selected content processing extension is a translation extension configured to translate a portion of content provided by the browser application.

6. The method of claim 1, wherein the results of the processing of the reformatted content items comprise the reformatted content item displayed in a user interface associated with the container application associated with the selected content processing extension.

7. The method of claim 1, wherein the content viewing application is launched in a sandbox of the client device based on a security context, and wherein the selected content processing extension is launched in a different sandbox of the client device based on a different security context.

8. The method of claim 7, further comprising:

receiving a notification of one or more of the content processing extensions from an operating system executing on the client device responsive to a request from the content viewing application.

9. The method of claim 1, wherein when being executed, the selected content processing extension and the container application associated with the selected content processing extension access at least one common library.

10. The method of claim 1, wherein each of the content processing extensions are assigned to a security context indicating protocols for communication between the content processing extension and the content viewing application on the client device.

11. The method of claim 10, wherein at least one of the assigned security contexts is shared by a plurality of the content processing extensions.

12. The method of claim 1, wherein the server provisions or distributes at least one of the content viewing application or the selected content processing extension.

13. A non-transitory computer readable storage medium having instructions stored therein, which when executed by a processor, cause the processor to:

display, in a user interface for a content viewing application executing on a client device within a first address space, a page comprising a plurality of content items;

detect a user input to activate a content activity interface including a list of content processing extensions, each content processing extension comprising data conversion code associated with a corresponding container application different from the content viewing application executable by the client device;

receive a selection of one of the content processing extensions from the content activity interface;

execute, within the content viewing application, the data conversion code associated with the selected content processing extension to identify one or more of the plurality of content items presented by the content viewing application and to reformat the identified one or more content items into a format compatible with the content processing extension;

transmit the reformatted content items to the selected content processing extension for processing within a second address space different than the first address space;

execute the selected content processing extension according to entitlements specified by a server for the second address space, the entitlements indicating resources that the selected content processing extension is entitled to access during execution; and generate, for display on the client device, a page comprising results of the processing of the reformatted content items by the selected content processing extension.

14. The non-transitory computer readable storage medium of claim 13, wherein the selected content viewing application and the content processing extension communicate with each other via an extension point, and wherein the extension point is one of a plurality of extension points of an operating system executing on the client device, each extension point corresponding to a set of predefined application programming interfaces (APIs) and a set of predefined resource entitlements.

15. The non-transitory computer readable storage medium of claim 14, further comprising instructions stored therein, which when executed by the processor, cause the processor to enable the content viewing application to access a functionality provided by the selected content processing extension via the extension point without having to execute the container application associated with the selected content processing extension.

16. The non-transitory computer readable storage medium of claim 13, wherein the content viewing application is a browser application, and wherein the selected content processing extension is a translation extension configured to translate a portion of content provided by the browser application.

17. A device, comprising:
    a processor; and
    a memory coupled to the processor for storing instructions, which when executed cause the processor to:
        display, in a user interface for a content viewing application executing on a client device within a first address space, a page comprising a plurality of content items;
        detect a user input to activate a content activity interface including a list of content processing extensions, each content processing extension comprising data conversion code associated with a corresponding container application different from the content viewing application executable by the client device;
        receive a selection of one of the content processing extensions from the content activity interface;
        execute, within the content viewing application, the data conversion code associated with the selected content processing extension to identify one or more of the plurality of content items presented by the content viewing application and to reformat the identified one or more content items into a format compatible with the content processing extension;
        transmit the reformatted content items to the selected content processing extension for processing within a second address space different than the first address space;
        execute the selected content processing extension according to entitlements specified by a server for the second address space, the entitlements indicating resources that the selected content processing extension is entitled to access during execution; and
        generate, for display on the client device, a page comprising results of the processing of the reformatted content items by the selected content processing extension.

18. The device of claim 17, wherein the content viewing application and the selected content processing extension communicate with each other via an extension point, and wherein the extension point is one of a plurality of extension points of an operating system executing on the client device, each extension point corresponding to a set of predefined application programming interfaces (APIs) and a set of predefined resource entitlements.

19. The device of claim 18, further comprising instructions stored in the memory, which when executed by the processor, cause the processor to enable the content viewing application to access a functionality provided by the selected content processing extension via the extension point without having to execute the container application associated with the selected content processing extension.

20. The device of claim 17, wherein the data conversion code stored in the memory is an executable script embedded within the selected content processing extension.

\* \* \* \* \*